United States Patent [19]
Liddell et al.

[11] Patent Number: 5,851,618
[45] Date of Patent: Dec. 22, 1998

[54] PEELABLE FLOOR COATING SYSTEMS

[75] Inventors: Kimm Alan Liddell, Cincinnati; Mohsen Mohamed Marzouk, Sharonville, both of Ohio

[73] Assignee: Illinois Tool Works Inc., Glenview, Ill.

[21] Appl. No.: 955,082

[22] Filed: Oct. 21, 1997

[51] Int. Cl.$^6$ .............. B65B 33/00; B05D 3/12; D06N 7/00
[52] U.S. Cl. ............ 428/41.8; 427/154; 427/407.1; 427/416; 427/413; 428/40.5; 428/413; 428/484; 428/537.1
[58] Field of Search .................. 427/154, 155, 427/208.8, 408, 416, 407.1, 393.6, 397, 413, 386; 428/40.1, 41.8, 40.5

[56] References Cited

U.S. PATENT DOCUMENTS

| | | | |
|---|---|---|---|
| 3,620,796 | 11/1971 | Gordy | 427/154 |
| 4,082,830 | 4/1978 | Cogliano | 427/154 |
| 4,200,671 | 4/1980 | Krajewski et al. | 427/264 |
| 4,363,145 | 12/1982 | Kawsch | 427/407.1 |
| 4,548,967 | 10/1985 | Brown et al. | 427/154 |
| 4,590,097 | 5/1986 | Booth et al. | 427/154 |
| 4,680,237 | 7/1987 | Kenney et al. | 427/154 |
| 4,748,049 | 5/1988 | Charles et al. | 427/154 |
| 5,116,439 | 5/1992 | Raus | 428/43 |
| 5,143,949 | 9/1992 | Grogan et al. | 427/154 |
| 5,411,760 | 5/1995 | Woodhall et al. | 427/154 |
| 5,418,006 | 5/1995 | Roth et al. | 427/154 |
| 5,431,962 | 7/1995 | Glass et al. | 427/407.1 |
| 5,444,108 | 8/1995 | Hagquist et al. | 523/455 |
| 5,618,582 | 4/1997 | VanWinckel | 427/408 |
| 5,759,705 | 6/1998 | Sinko | 427/408 |
| 5,773,091 | 6/1998 | Perlman et al. | 427/154 |

OTHER PUBLICATIONS

Internet Advertisement for a Peelable Spray Booth Coating by Chemco Manufacturing at http://www.uponair.com/chemco/coatings.html (Dec. 1997).

Internet Advertisement for a temporary peelable sheet film protecting coating by Croco Specialty Coating at http://www.onlinetoday.com/users/groco (Dec. 1997).

*Primary Examiner*—Diana Dudash
*Attorney, Agent, or Firm*—Killworth, Gottman, Hagan & Schaeff, LLP

[57] ABSTRACT

A peelable floor coating system is provided which may be used on a variety of floor surfaces. In one embodiment, the peelable floor coating system comprises a release coating applied to the floor surface and a durable coating applied to the release coating. In another embodiment, the peelable floor system comprises a barrier coating applied to a floor surface and a durable coating applied to the barrier coating. The peelable floor coating system as applied to a floor surface 1) is easy to apply; 2) is level; 3) is easy to keep clean; 4) can be made a color which optimizes lighting; 5) can be applied to many floor types; 6) can be applied over floors in nearly any condition; 7) can be easily peeled up by hand; and 8) can be easily reapplied to renew the floor surface.

30 Claims, No Drawings

PEELABLE FLOOR COATING SYSTEMS

FIELD OF THE INVENTION

The present invention relates to a peelable floor coating system and more particularly to a peelable floor coating system comprising a release coating or a barrier coating and a durable coating applied to the release coating or barrier coating.

BACKGROUND OF THE INVENTION

There are many floor coatings on the market which seal and protect floors. However, when these floor coatings are dirty or worn, they require a significant amount of cleaning and/or stripping with chemicals and scrapers before a new coating can be applied. This is particularly problematic for highly abused floors, such as floors in spray booths, mixing rooms, prep stations and the like, where the floor can quickly become crusted with paint overspray, etc.

An attempt to overcome this problem utilizes a latex floor coating. When dirty or worn, the latex floor coating may be easily peeled up in large sheets and new latex coating applied. However, latex floor coatings lack durability and are not suitable for use in high traffic areas or areas utilized for vehicle traffic.

Accordingly, the need remains for an improved floor coating which is durable, yet easily applied and removed.

SUMMARY OF THE INVENTION

That need is met by the present invention. Thus, in one embodiment, there is provided a peelable floor coating system comprising 1) a release coating applied to a floor surface and 2) a durable coating applied to the release coating. In another embodiment, there is provided a peelable floor coating system comprising 1) a barrier coat applied to a floor surface and 2) a durable coating applied to the barrier coat.

In addition, in another embodiment, there is provided a method of forming a peelable coating on a floor surface comprising the steps of:

a) applying a release coating to a floor surface;
b) allowing the release coating to dry; and
c) applying a durable coating over the dry release coating.

In still another embodiment, there is provided a method of forming a peelable coating on a floor surface comprising the steps of:

a) applying a barrier coating to a floor surface;
b) allowing the barrier coating to dry if necessary; and
c) applying a durable coating over the dry barrier coating.

In another embodiment of the invention, pigments as well as abrasives may be added to the durable coating.

In still another embodiment of the invention, a latex maintenance coat may be applied over the durable coating to extend the life of the peelable floor system. The latex maintenance coat may be reapplied multiple times as needed, but when necessary, may be peeled away from the durable coating and reapplied.

The peeleable floor coating system of the present invention as applied to a floor surface 1) is easy to apply; 2) is self-leveling; 3) is easy to keep clean; 4) can be made a color which optimizes lighting; 5) can be applied to many floor types; 6) can be applied over floors in nearly any condition; 7) can be easily peeled up by hand; and 8) can be easily reapplied to renew the floor surface.

DETAILED DESCRIPTION OF THE INVENTION

In one embodiment of the present invention, the peelable floor coating system comprises a release coating which is applied to the floor surface and a durable coating which is applied over the release coating, such that the durable coating adheres to the release coating, but not the floor surface. The floor coating system of this embodiment is rendered peelable by 1) the choice of a release coating which, although binding to the floor surface, forms a stronger bond to the durable coating than to the floor surface and 2) the choice of a durable coating which binds to the release coating.

In another embodiment of the present invention, the peelable floor coating system comprises a barrier coating which is applied to the floor surface and a durable coating which is applied over the barrier coating. The floor coating system of this embodiment is rendered peelable by the choice of a barrier coating which prevents the durable coating from binding to the floor surface.

A release coating is any coating which has sufficient adhesion properties to bond to the floor surface, but which forms a stronger bond to the durable coating than to the floor surface. Examples of suitable release coatings are pure latex resin, latex paints, and poly vinyl alcohol, wherein latex-based coatings are preferred and pure latex is especially preferred. These materials are all commercially available from numerous sources, such as resin an chemical suppliers.

A barrier coating is any material which does not bind to the durable coating, but simply prevents the durable coating from adhering to the floor. A typical example of such a material is a wax.

In the embodiment which utilizes a release coating in conjunction with a durable coating, the durable coating may be any coating that is durable enough to withstand high traffic and vehicle traffic, which binds to the release coating, and which may be pulled up in sheets. Examples of suitable durable coatings are epoxy coatings or urethane coatings, wherein epoxy coatings are preferred. Typical epoxy coatings are comprised of a epoxy resin (i.e., the polymeric reaction product of bis-phenol A and epichloro hydrin) and a hardener, such as an amine, which are mixed just prior to application. A typical epoxy resin is bis-phenol A/epichloro hydrin which is available under the Trademark Epone and supplied by Shell. A typical hardener is a polyoxyalkylene amine, available under the Trademark Jeffamin and supplied by Texaco, which is blended with an amine curing agent. A typical amine curing agent is a mixture of 80% of a primary amine, such as a polyoxyalkylene such as Jeffamine and a secondary amine, such as N-aminoethylpiperazine and 20% of a tertiary amine, such as N-aminoethylpiperazine and constitutes approximately 25–50% of the total weight of the blended hardener, with 30–45 being preferred, with 35–38% being particularly preferred, and 37.9% being most preferred. In addition, the hardener may also be blended with plasticizers and accelerators prior to use. A typical plasticizer is a mixture of 80% a alkyl phenol, such as p-nonylphenol and 15% of a alkyl terephthalate, such as dioctylterephthalate and can constitute anywhere from 0 to about 75% of the total weight of the blended hardener, with 50–70 being preferred and 55–65 being particularly preferred and 60.5% being most preferred. A typical accelerator is alkylamino phenol, such as 2,4,6-tris[dimethylaminomethyl]phenol and can constitute anywhere from 0 to about 5% of the total weight of the blended hardener, with 1 to about 3% being preferred, and 1.5 to 2% being particularly preferred, and 1.60% being most preferred.

In the embodiment which utilizes a barrier coating in conjunction with a durable coating, the durable coating may be any coating that is durable enough to withstand high traffic and vehicle traffic and which may be pulled up in sheets. Examples of suitable durable coatings are epoxy coatings or urethane coatings, wherein epoxy coatings are preferred. Typical epoxy coatings are comprised of a epoxy resin (i.e., the polymeric reaction product of bis-phenol A and epichloro hydrin) and a hardener, such as an amine, which are mixed just prior to application. A typical epoxy resin is bis-phenol A/epichloro hydrin which is available under the Trademark Epone and supplied by Shell. A typical hardener is a polyoxyalkylene amine, available under the Trademark Jeffamin and supplied by Texaco, and is blended prior to use.

The durable coating may further include a pigment from about 0 to 3% by weight of the durable coating. Typical pigments are titanium dioxide and Lamp Black™ available as a white pigment dispersion and a black pigment dispersion, and supplied by Sheffield Bronze Paint Corp. Although pigments of any color may be used, it is preferred that a pigment which renders the durable coating a light gray color be used to enhance the lighting of the area where the peelable floor coating is utilized.

The peelable floor coating systems of the present invention may be applied to a new floor, thus keeping it in its original condition. However, they can also be applied directly over a floor in poor condition, over a floor which has an existing coating, or over a floor which is crusted with paint spray, etc. However, it is preferable that the floor surface be swept to remove loose debris and excessive dirt with a power washer. And although not necessary, if the floor has an existing coating or is crusted with paint spray, etc., the floor is preferably stripped to give a clean smooth surface.

The peelable floor coating systems of the present invention may be applied to any floor which has sufficient cohesive strength to remain intact when the durable coating is pulled up. Examples of floors which are suitable for application of the peelable floor system of the present invention are floors made of cement, cinder, steel, wood, aluminum, masonry, and the like.

In a typical application of a peelable floor system comprising a first release coating and a second durable coating, after the floor is completely dry, the release coating is applied by roller coating it onto the dry floor surface with a short nap roller, typically ¼" to ⅜" nap, to an approximate thickness of 4 mils to 10 mils. Alternatively, the release coating may be sprayed or brushed onto the dry floor surface. When the release coating is dry to touch, the durable coating is applied by roller coating it onto the floor surface with a short nap roller, typically ¼" to ⅜" nap, to an approximate thickness of 40 mils to ¼ in. The peelable floor coating system is applied between 55° F. and 95° F. and should be applied in a well-ventilated area.

In a typical application of a peelable floor system comprising a first barrier coating and a second durable coating, after the floor is completely dry, the barrier coating is applied by spray, roller-coating or brush, to an approximate thickness of 4 mils to 10 mils. When the barrier coating is dry, the durable coating is applied in the same manner as above.

If a skid resistant surface is desired, an abrasive may be added to the durable coating prior to application. Typical abrasives are sand, silica, and the like and will typically be added to the durable coating at approximately 5–20 oz. per gallon of durable coating, and preferably 6–10 oz. per gallon.

Optionally, a latex maintenance coating may be applied over the durable coating after the durable coating is dry to touch. The maintenance coating is typically a latex resin to which agents have been added to render the latex more elastic and peelable. Typical additives are rheology modifiers, coalescent agents, wetting agents, foaming control agents, and release control agents. In a typical application, after the durable coating is completely dry, the maintenance coating is applied by rolling it onto the dry floor surface with a short nap roller, typically ¼" to ⅜" nap, to an approximate thickness of 4 mils to 10 mils.

Based on the foregoing, the preferred peelable floor coating system which utilizes a release coating in conjunction with a durable coating comprises: 1) a latex as the release coating and 2) an epoxy as the durable coating.

More preferably, this peelable floor coating system comprises: 1) 100% pure latex as the release coating and 2) an epoxy as the durable coating.

Still more preferably, this peelable floor coating system comprises: 1) 100% pure latex as the release coating; and 2) an epoxy containing a titanium dioxide as the durable coating.

In addition, based upon the above, the preferred peelable floor coating system which utilizes a barrier coating in conjunction with a durable coating comprises: 1) a wax as a barrier coating; and 2) an epoxy as a durable coating.

More preferably, this peelable floor coating system comprises: 1) a wax barrier coating; and 2) an epoxy containing titanium dioxide as the durable coating.

The resulting floor surface is level, durable, and easy to clean. It may be swept, subjected to pressuring washing, scrubbed, and cleaned with detergents and mild solvents, such as mineral spirits.

When desired, the peelable floor coating system of the present invention which utilizes a release coating in conjunction with a durable coating can be quickly removed by pulling the release coating, the durable coating, and the maintenance coating, if used, up in large sheets. The floor is restored to its original, pre-application condition and the peelable floor coating system may then be reapplied.

In addition, when desired, the peelable floor coating system of the present invention which utilizes a barrier coating in conjunction with a durable coating can also be quickly removed by pulling the durable coating, and maintenance coating, if used, up in large sheets, leaving a majority of the barrier coating on the floor surface. The barrier coating may, if necessary, be renewed prior to the reapplying the durable coat and maintenance coat, if used.

What is claimed is:

1. A peelable floor coating system comprising a release coating applied to a floor surface and a durable coating applied to the release coating, wherein the release coating has sufficient adhesion properties to bond to the floor surface, but which forms a stronger bond to the durable coating than to the floor surface and wherein the durable coating binds to the release coating and may be pulled up in sheets.

2. A system according to claim 1 wherein the release coating is a latex.

3. A system according to claim 1 wherein the durable coating is an epoxy.

4. A system according to claim 1 wherein the durable coating further includes a pigment.

5. A system according to claim 4 wherein the pigment is a titanium dioxide.

6. A system according to claim 4 wherein the pigment is a black pigment dispersion.

7. A system according to claim 1 wherein the durable coating further includes an abrasive.

8. A system according to claim 1 which further includes a latex maintenance coating over the durable coating.

9. A system according to claim 8 wherein the latex maintenance coating further includes any one or any combination of additives consisting of the following: 1) rheology modifiers, 2) coalescent agents, 3) wetting agents, 4) foaming control agents, and 5) release control agents.

10. A peelable floor coating system comprising a latex release coating selected from a pure latex resin or a latex paint applied to a floor surface and an epoxy as a durable coating applied to the latex release coating.

11. A system of claim 10 wherein the latex release layer is pure latex and the epoxy is comprised of 1 part of a bisphenol A/epichlorohydrin epoxy resin and 1 part of a polyoxyalkylene amine hardener.

12. A system according to claim 11 wherein the epoxy further comprises 0 to 3% titanium dioxide.

13. A system according to claim 11 wherein the epoxy further comprises 0 to 3% a black pigment dispersion.

14. A peelable floor system comprising a barrier coating applied to a floor surface and a durable coating applied to the barrier coating, wherein the barrier coating prevents the durable coating from binding to the floor surface and wherein the durable coating may be pulled up in sheets.

15. A system according to claim 14 wherein the barrier coating is a wax.

16. A system according to claim 14 wherein the durable coating is an epoxy.

17. A system according to claim 14 wherein the durable coating further includes a pigment.

18. A system according to claim 17 wherein the pigment is a titanium dioxide.

19. A system according to claim 17 wherein the pigment is a black pigment dispersion.

20. A system according to claim 14 wherein the durable coating further includes an abrasive.

21. A system according to claim 14 which further includes a maintenance coating over the durable coating.

22. A system according to claim 21 wherein the maintenance coating further includes any one or any combination of additives consisting of the following: 1) rheology modifiers, 2) coalescent agents, 3) wetting agents, 4) foaming control agents, and 5) release control agents.

23. A peelable floor coating system comprising wax as a barrier coating applied to a floor surface and an epoxy as a durable coating applied to the wax barrier coating.

24. A system of claim 23 wherein the epoxy is comprised of 1 part of a bisphenol A/epichlorohydrin epoxy resin and 1 part of a polyoxyalkylene amine hardener.

25. A system according to claim 24 wherein the epoxy further comprises 0 to 3% titanium dioxide.

26. A system according to claim 24 wherein the epoxy further comprises 0 to 3% a black pigment dispersion.

27. A method of forming a peelable floor coating system on a floor surface comprising the steps of:

a) applying a release coating to the floor surface;

b) allowing the release coating to dry; and c) applying a durable coating over the release coating, wherein the release coating has sufficient adhesion properties to bond to the floor surface, but which forms a stronger bond to the durable coating than to the floor surface and wherein the durable coating binds to the release coating and may be pulled up in sheets.

28. A method according to claim 27 wherein the release coating is a latex coating and the durable coating is an epoxy coating.

29. A method of forming a peelable floor coating system on a floor surface comprising the steps of:

a) applying a barrier coating to the floor surface;

b) allowing the barrier coating to dry, if necessary; and c) applying a durable coating over the barrier coating, wherein the barrier coating prevents the durable coating from binding to the floor surface and wherein the durable coating may be pulled up in sheets.

30. A method according to claim 29 wherein the barrier coating is a wax and the durable coating is an epoxy coating.

* * * * *